United States Patent
Ichikawa et al.

(10) Patent No.: US 6,628,577 B2
(45) Date of Patent: Sep. 30, 2003

(54) DISC PLAYER

(75) Inventors: Yoshihiro Ichikawa, Saitama-ken (JP); Masayuki Saitoh, Saitama-ken (JP); Shogo Sato, Saitama-ken (JP); Yoshitake Shimada, Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 260 days.

(21) Appl. No.: 09/818,585

(22) Filed: Mar. 28, 2001

(65) Prior Publication Data

US 2001/0028609 A1 Oct. 11, 2001

(30) Foreign Application Priority Data

Mar. 30, 2000 (JP) ........................................ 2000-094684

(51) Int. Cl.⁷ .............................................. G11B 17/22
(52) U.S. Cl. ......................................................... 369/37
(58) Field of Search .......................... 369/37, 75.1–75.2, 369/77.1–77.2, 289, 249, 224

(56) References Cited

U.S. PATENT DOCUMENTS 5,467,328 A * 11/1995 Murakami et al. ....... 369/44.16
6,011,756 A * 1/2000 Lee ............................ 369/289

* cited by examiner

Primary Examiner—Allen Cao
(74) Attorney, Agent, or Firm—Arent Fox Kintner Plotkin & Kahn

(57) ABSTRACT

A motor is provided on a slide base of a disc player. A flexible cable for supplying an electric power and control signals to the motor and a player and the like is connected to the motor at one end thereof, and to a player disposed in a chassis at the other end. When the slide base is located in a disc storing position, the flexible cable is bent ahead of the both ends, so that the wiring within the disc player can be simplified.

10 Claims, 22 Drawing Sheets

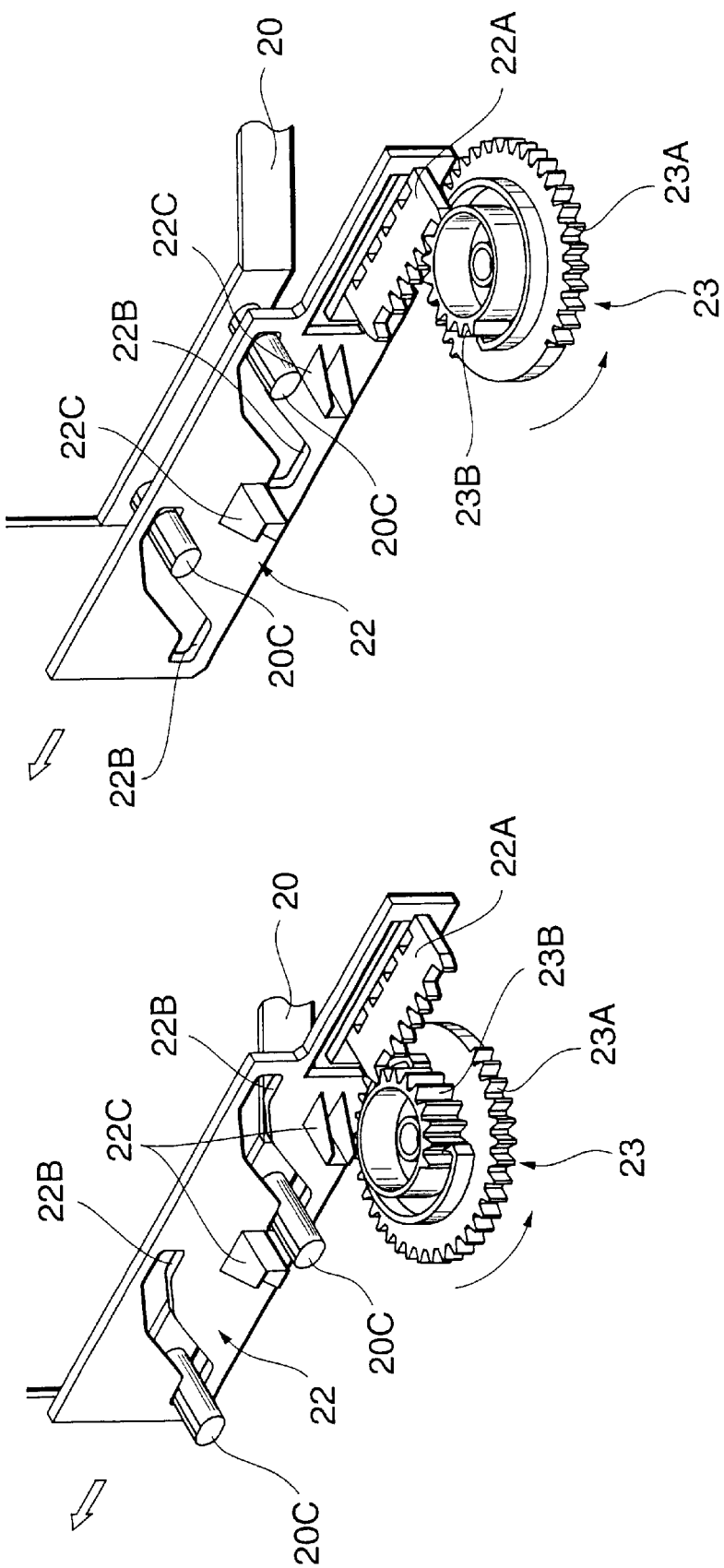

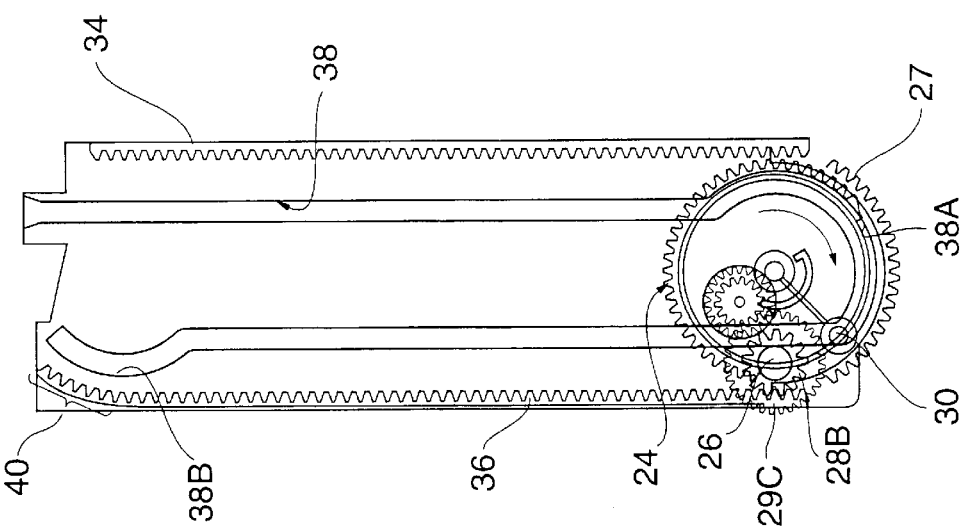
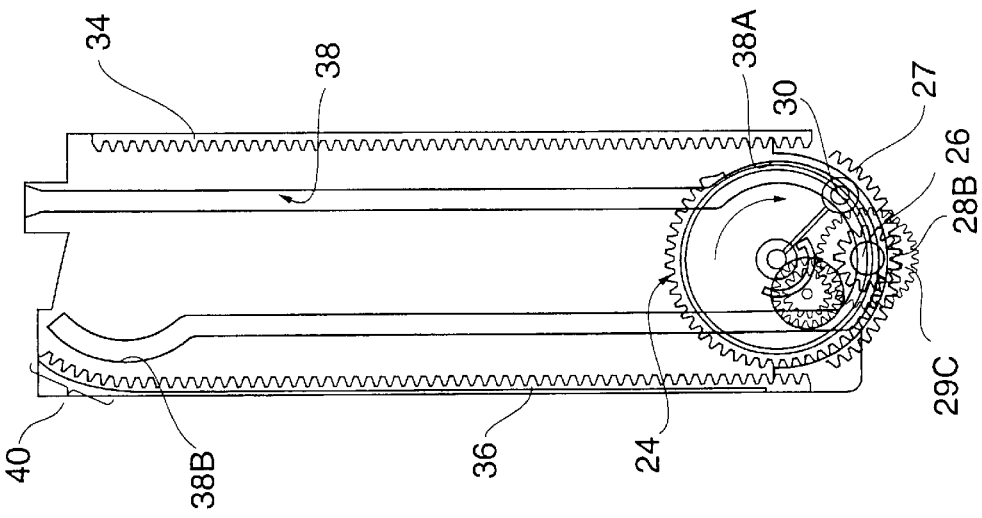
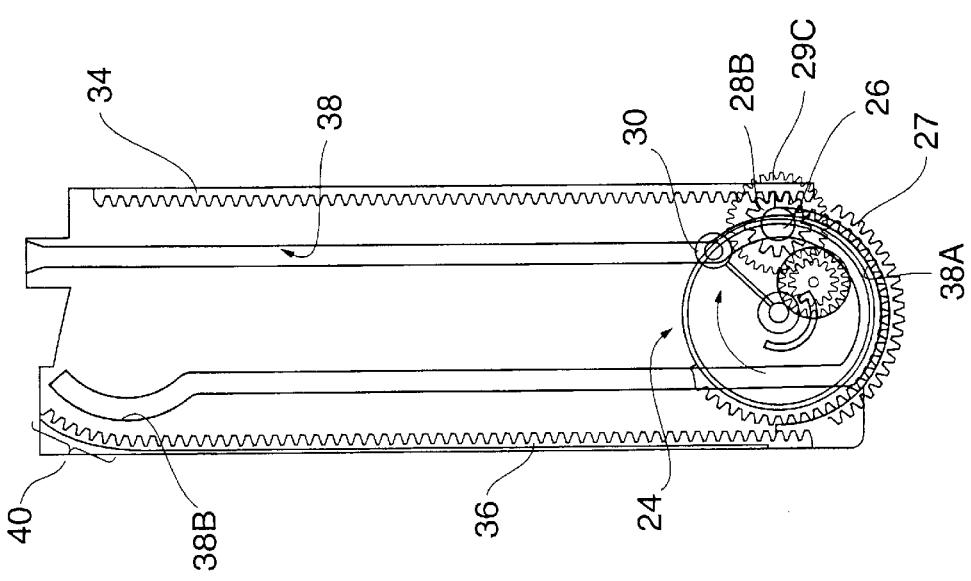

DISC PLAYER

BACKGROUND OF THE INVENTION

The present invention relates to a disc player such as a single disc player, or a carousel-type disc player capable of playing a selected one of a plurality of discs. More particularly, the invention relates to a loading-type disc player having a slide base holding discs thereon and movable back and forth for transferring the discs between an exchange position and a store position.

Conventional disc players include a carousel type player having a rotatable tray for carrying a plurality of medium discs such as CD, DVD, and the like, a desired one of these discs being selected and played.

Japanese Patent Application Laid-Open Publication No. 5-182335, for example, discloses one such multi-disc player. The multi-disc player disclosed in this publication includes a slide base or tray base on which a plurality of discs are mounted, wherein forward and backward movements of the slide base are effected through a motor disposed within a chassis. On the other hand, another motor is provided for driving the rotary tray mounted on the slide base.

However, the multi-disc player disclosed in the above-mentioned Japanese Patent Laid-Open Publication No. 5-182335 has the problem of complication in wiring process to motors since the movement of the slide base and the rotation of the rotary tray are conducted by each different motor.

SUMMARY OF THE INVENTION

The present invention has been devised for solving the problems described above, and an object of the present invention is to provide a disc player which can be manufactured at low cost and with a small size of the disc player itself due to simplification of wiring within the disc player.

To accomplish the above-mentioned object, according to a first aspect of the present invention, there is provided a disc player comprising a chassis, a rotary tray mountable a plurality of discs arranged in a circumferential direction thereon, a slide base supported on the chassis for supporting the rotary tray, a rotary tray driving mechanism for rotating the rotary tray on the slide base, a slide base driving mechanism for moving the slide base back and forth on the chassis between a disc exchanging position where the slide base is projected ahead of the chassis and a disc storing position where the slide base is substantially overlapped with the chassis, and a player disposed backward within the chassis, wherein the rotary tray driving mechanism includes a driving source provided on the slide base, and wiring for supplying an electric power and control signals to the driving source, and wherein the wiring is connected to the driving source at one end thereof, and to the chassis at the other end, which is bent at a position ahead of the one end and the other end of the wiring when the slide base is positioned at the disc storing position.

In addition, according to a second aspect based on the first aspect of the present invention, the one and the other end of the wiring is connected to the driving source and the chassis, respectively, ahead of the player.

As an effect thereof, the wiring does not interfere with the player or the like disposed on the chassis, thus the space within the chassis can be effectively utilized for permitting the wiring to be moved freely.

According to a third aspect based on the first aspect of the present invention, the chassis is provided with a holding hook for preventing the wiring from separating from the chassis.

As an effect thereof, it is possible to prevent such unstable movement of the wiring within the casing that the wiring touches and separates from the chassis rondomly.

According to a fourth aspect based on the first aspect of the present invention, the driving source is positioned on the slide base in such a manner that a connecting portion between the driving source and the wiring remains within a casing of the disc player even when the slide base is moved to the disc exchanging position.

As an effect thereof, the connection joint between the driving source, for example, motor and the wiring, for example, flexible cable can be prevented from being exposed to the outside, and thus from gathering dust.

Also, according to a fifth aspect based on the first aspect of the present invention, the disc player further comprises a float base supported on the chassis, and a bending piece mounted on the float base for folding the wiring at a given location in advance so as to allow the wiring to be accommodated at a predetermined position where a direction of the wiring is altered.

According to a sixth aspect based on the fifth aspect of the present invention, the bending piece comprises a lateral piece and a longitudinal piece, which are respectively formed with a certain clearance between themselves and an underside of the float base, and both outward ends of which are used for folding the wiring.

As an effect thereof, it is possible to save the labor for measuring the wiring each time to determine the position at which it should be folded during the production thereof.

Then, according to a seventh aspect of the present invention, A disc player comprising a chassis, a rotary tray mountable a plurality of discs arranged in a circumferential direction thereon, a slide base supported on the chassis for supporting the rotary tray, a rotary tray driving mechanism for rotating the rotary tray on the slide base, a slide base driving mechanism for moving the slide base back and forth on the chassis between a disc exchanging position where the slide base is projected ahead of the chassis and a disc storing position where the slide base is substantially overlapped with the chassis, a player disposed backward within the chassis, a guide rail formed on each right and left side of the chassis in a moving direction of the slide base, and a first guide piece and a second guide piece provided on each side of an underside of the slide base, the each side having the same width as that of guide rails, extending laterally, so as to allow the slide base to be slid along the guide rail, wherein the first and second guide pieces are positioned upper than the guide rail so as to prevent the slide base from being lifted up during its back and forth movement.

Further, according to an eighth aspect based on the seventh aspect of the present invention, the each guide rail has a recess for inserting the second guide piece so that the slide base can be slid along the guide rail of the chassis after inserting the second guide piece into the recess so as to assemble the slide base with the chassis.

As an effect thereof, the back and forth movement of the slide base can be smoothly carried out along the guide rail of the chassis.

In addition, according to an ninth aspect based on the seventh aspect of the present invention, the second guide piece has a lateral length shorter than that of the first guide piece so as to be easily inserted into the guide rail through the recess on the guide rail.

According to an tenth aspect based on the seventh aspect of the present invention, a front end wall of the slide base is provided with engagement holes, wherein the each engagement hole is engaged with respective front distal ends of the guide rails to receive it when the slide base exists in the disc storing position, so that the slide base can be prevented from being lifted.

As an effect thereof, rattling also of the slide base can be prevented when reproducing the player.

BRIEF DESCRIPTION OF THE DRAWINGS

These and other objects and advantages of the present invention will become clear from the following description with reference to the accompanying drawings, wherein:

FIGS. 13(a) and 13(b) are schematic perspective views showing the relationship between a clamp cam of a clamp mechanism and a switch gear;

FIGS. 14(a) through 14(c) are diagrams given in explanation of the movement of the rotary member with respect to the slide base;

DETAILED DESCRIPTION OF THE PREFERRED EMBODIMENTS

Figure 1:
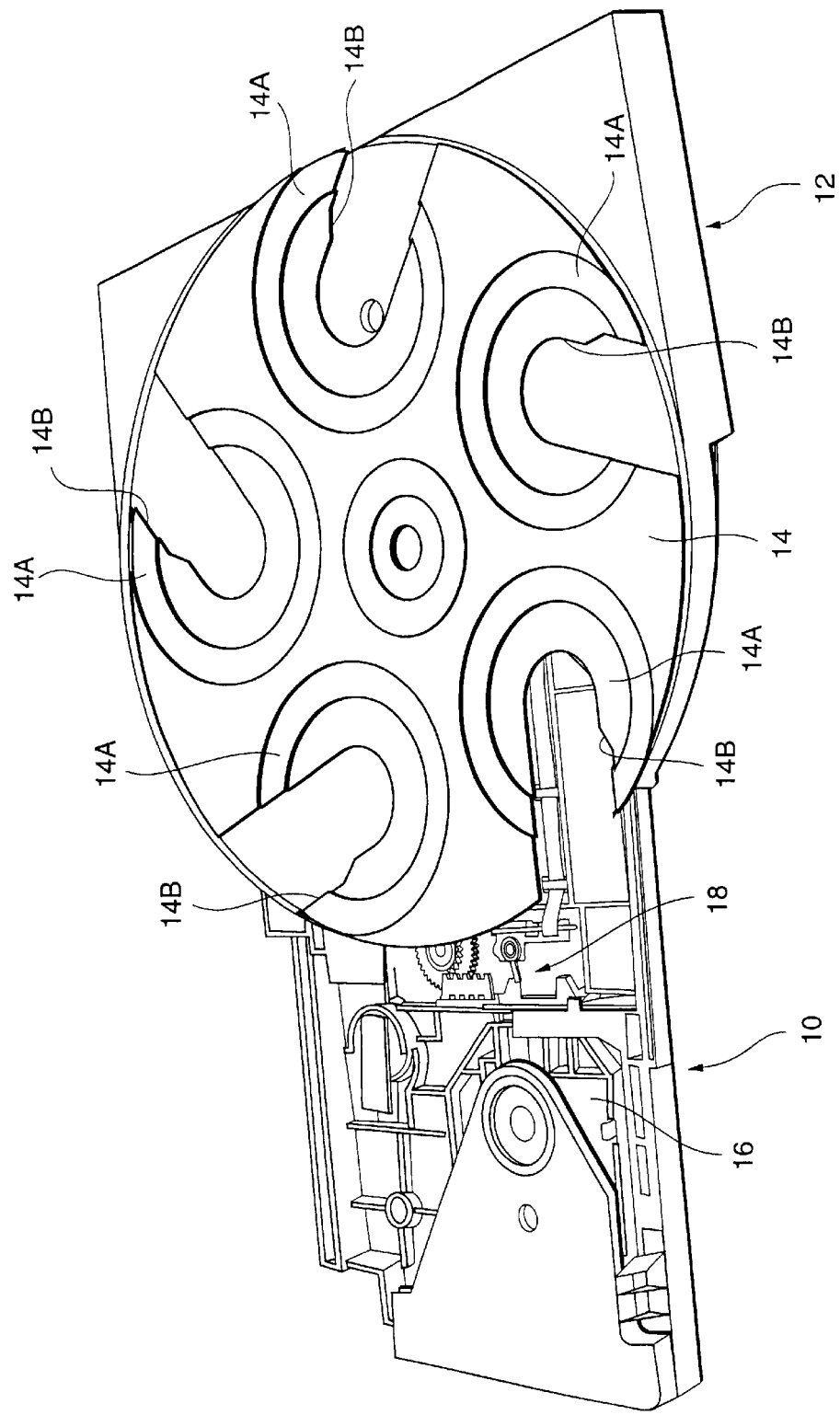
FIG. 1 is an overall perspective view showing the chassis of a disc player according to one embodiment of the invention, to which a slide base is coupled.
Figure 2:
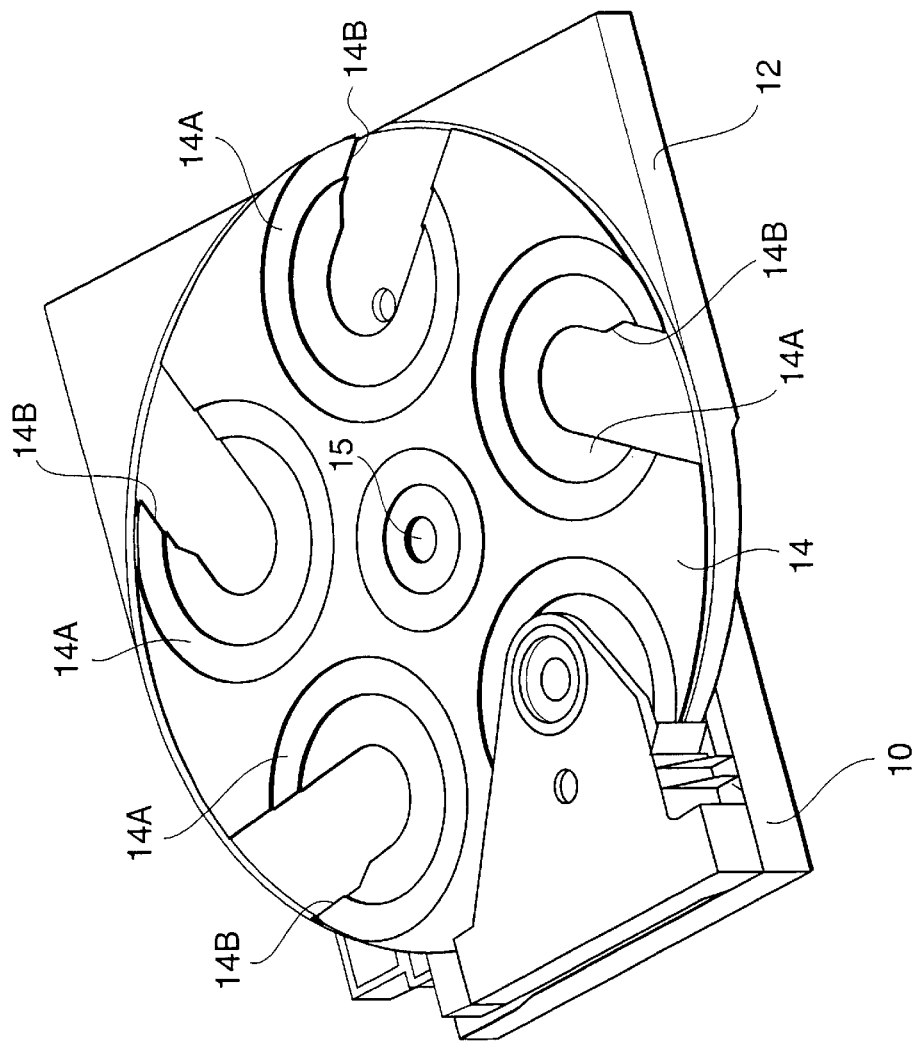
FIG. 2 is an overall perspective view showing the disc player according to the same embodiment, wherein the slide base is moved to its disc store position.

Preferred embodiments of the disc player according to the present invention will be hereinafter described with reference to the accompanying drawings. FIG. 1 and FIG. 2 are overall perspective views showing a disc player according to one embodiment of the present invention having a chassis and a slide base attached thereto. FIG. 1 illustrates a state wherein the slide base 12 is drawn out to a disc exchange position, whereas FIG. 2 illustrates a state wherein the slide base 12 has been moved to a disc store position.

As illustrated in the drawings, the disc player of this embodiment includes the chassis 10, the slide base 12, a rotary tray 14, and the like, all of which are normally accommodated within a casing (not shown). The chassis 10 includes therein a player 16 and a clamp mechanism 18 for clamping a disc above the player 16.

The rotary tray 14 is supported on the slide base 12 such as to be rotatable around an axis 15. A total of, for example, five disc receivers 14A are formed on the rotary tray 14 for holding, for example, five recording media such as discs. Each of the disc receivers 14A has a cut-out 14B, so that the slide base 12 does not interfere with the player 16 when it is moved thereto, or with the clamp mechanism 18 when the disc is clamped above the player 16. The rotary tray 14 is rotated by a drive motor to be described later, and stopped so as to position a selected disc over the player 16.

Figure 3:
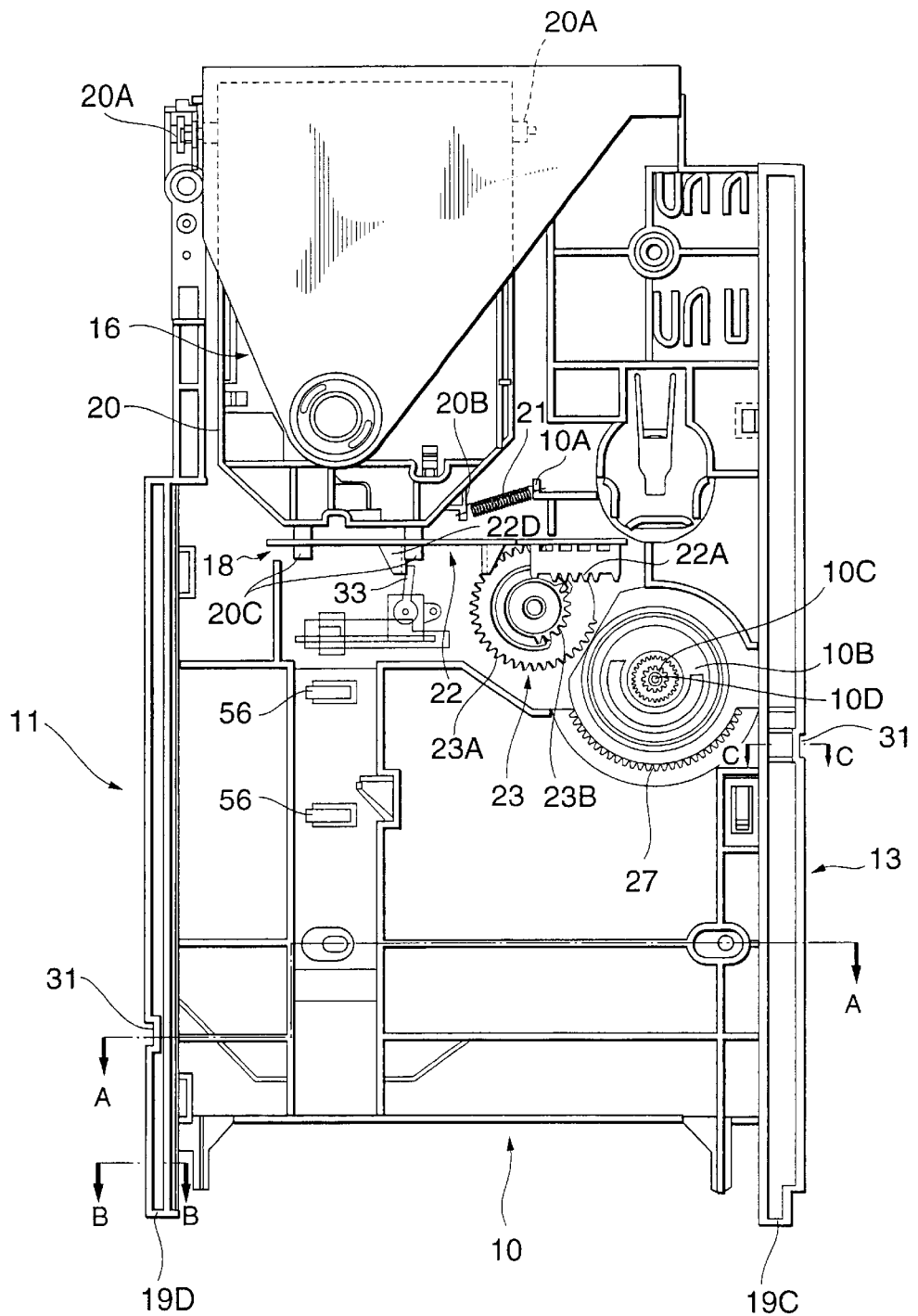
FIG. 3 is a top plan view of the chassis, which is a primary constituent part of this embodiment, from which the slide base has been removed.

FIG. 3 is a plan view of the chassis 10 from which the slide base 12 has been removed. The player 16 is arranged within a float base 20 provided in the back of the chassis 10. The float base 20 has a pair of rotary shafts 20A at the back which are rotatably supported on a mount base (not shown) in the chassis 10, so that it pivots around the rotary shafts 20A by the clamp mechanism 18. A disc located in the disc store position is clamped above the player 16 by means of a clamp cam 22, which is slidable in right and left directions.

The float base 20 is provided with a mount piece 20B for mounting a resilient member in the front on the right side. A spring 21 is bridged across the mount piece 20B and a mount piece 10A formed in the chassis 10 so as to absorb the vibration of the float base 20 generated during the play of a disc, for example. The clamp mechanism 18 includes a switch gear 23 for causing the clamp cam 22 to slide. The switch gear 23 is secured to the bottom of the chassis 10 such as to be rotatable. A rotational drive force is transmitted to the switch gear 23 from a rotary member 24 as just described hereinafter.

Figure 4:
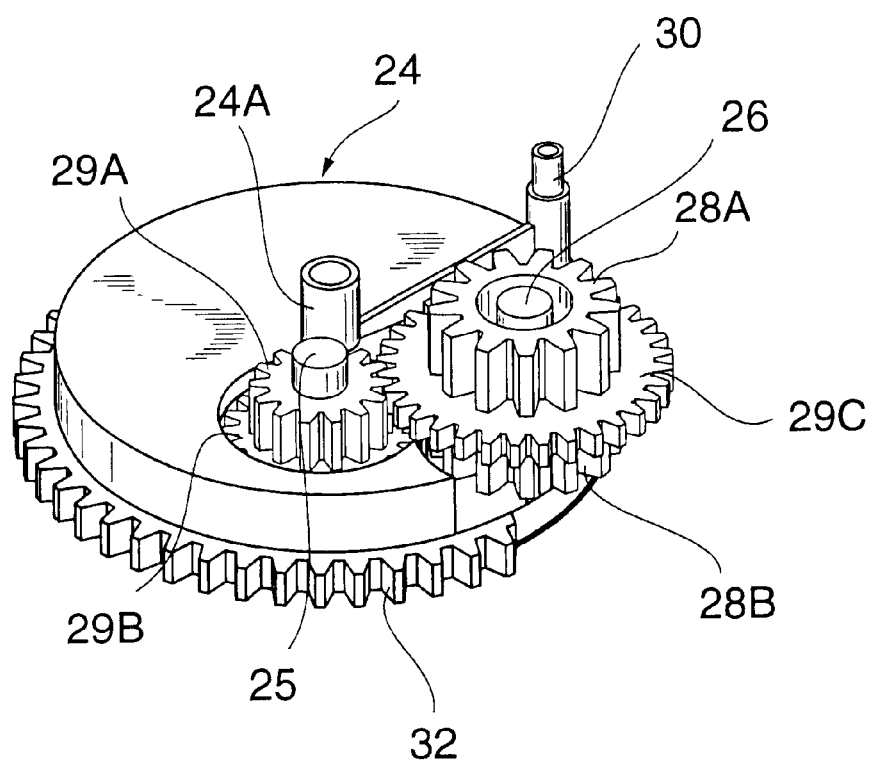
FIG. 4 is a perspective view of a rotary member, which is a primary constituent part of this embodiment.

FIG. 4 illustrates the rotary member 24. The rotary member 24 shown in FIG. 4 includes a revolution shaft 24A protruded at its center, and part of the rotary member 24 is cut out. Two reduction gears 29A, 29B are fitted in the cut-out portion of the rotary member 24 on one side thereof by a support shaft 25.

The revolution shaft 24A is cylindrical and fitted over the top of a support shaft 10D of a sun gear 10C, which is accommodated at the center of a recessed bearing 10B formed in the chassis 10 as shown in FIG. 3, and driven by a drive source (not shown). Thus, the revolution shaft 24A is rotatable with respect to the chassis 10.

On one side of the support shaft 25 stands a shaft 26 which is higher than the former. A planetary gear 28A is provided around the shaft 26 on the top, and a transmission gear 29C is fitted beneath the planetary gear 28A, and another planetary gear 28B beneath the transmission gear 29C. The transmission gear 29C and the planetary gear 28B engage with the reduction gears 29A, 29B, respectively.

The rotary member 24 is mounted on the chassis 10 by fitting its revolution shaft 24A on top of the support shaft 10D of the sun gear 10C. Thereupon, the reduction gear 29A engages with the sun gear 10C, whereby rotation of the sun gear 10C is transmitted to the transmission gear 29C. The rotary member 24 further has a vertically extending lock pin 30 for engagement with a cam groove, to be described later, formed on the back side of the slide base 12.

The lock pin 30 is offset circumferentially by about 45 degrees with respect to the center of the planetary gears 28A, 28B. A clamp gear 32 is formed partially around the outer circumference of the rotary member 24 for engagement with the switch gear 23 to be described later. The offset amount of the lock pin 30 with respect to the planetary gears 28A, 28B needs not be 45 degrees but may be suitably set.

Figure 5:
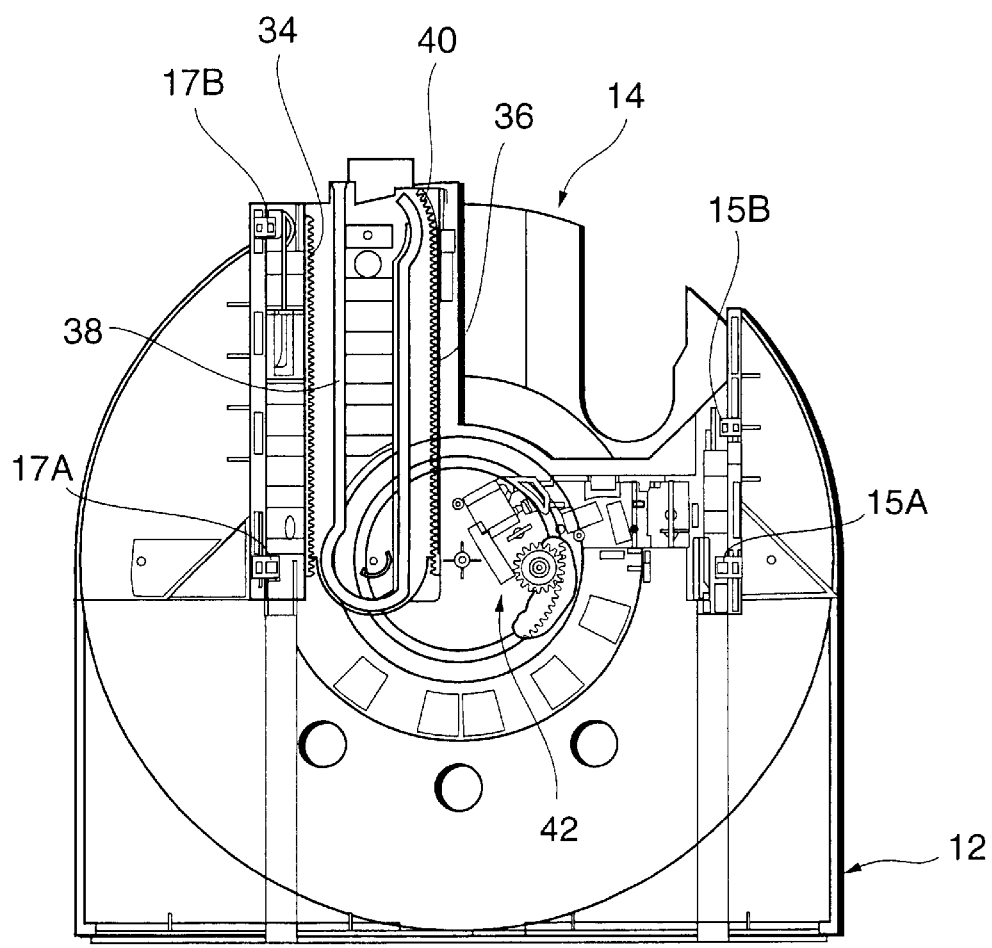
FIG. 5 is a bottom plan view of the slide base, which is a primary constituent part of this embodiment.

FIG. 5 is a bottom plan view of the slide base 12, illustrating the back side thereof. As shown in the drawing, a first linear rack gear 34 and a second linear rack gear 36 are formed in parallel for engagement with the above-mentioned planetary gear 28A. A linear cam groove 38 having straight parts parallel to the first linear rack gear 34 and the second linear rack gear 36 is further provided for engagement with the lock pin 30. The back end of the second linear rack gear 36 leads to a second arcuate rack gear 40 continuously.

The structures for attaching the slide base 12 to the chassis 10 will be described next. The chassis 10 is provided, on the tops of its right and left side walls, with laterally extending guide rails 11, 13 along the lengthwise direction for allowing the slide base 12 to move back and forth thereon. The guide rails 11, 13 have respective parallel outer rails 11A, 13A and inner rails 11B, 13B. The guide rail 13 is formed longer than the guide rail 11.

Figure 6:
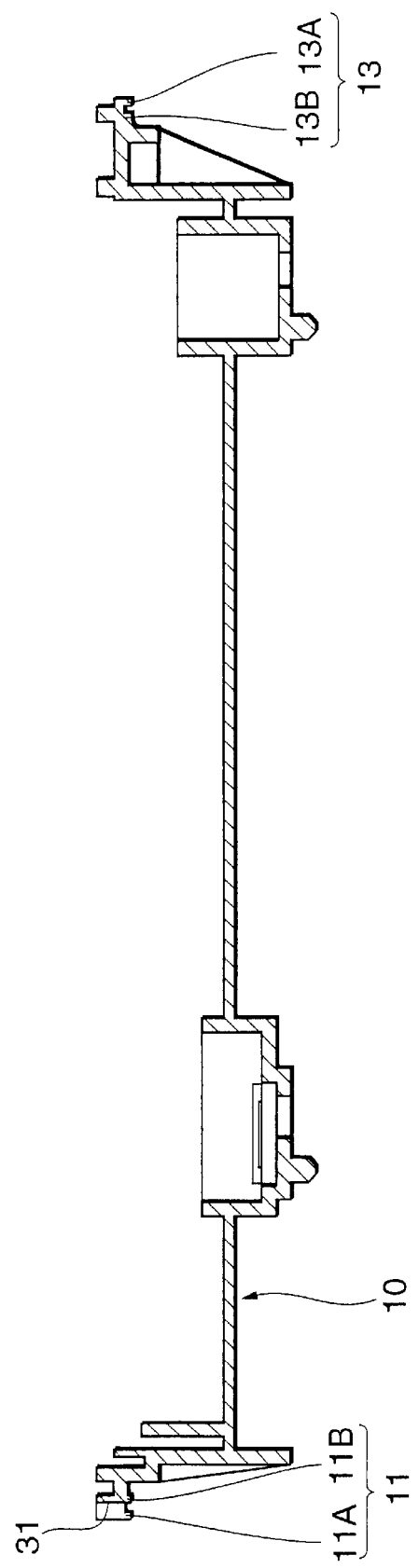
FIG. 6 is a cross sectional view taken along the arrows A—A in FIG. 3.
Figure 7:
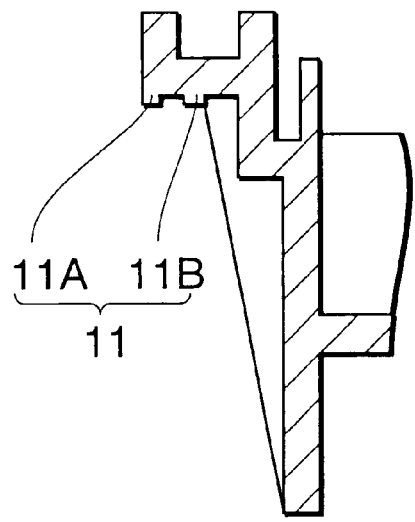
FIG. 7 is a cross sectional view taken along the arrows B—B in FIG. 3.
Figure 8:
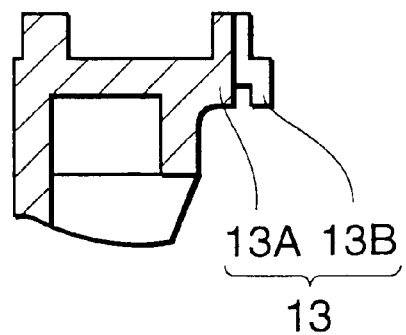
FIG. 8 is a cross sectional view taken along the arrows C—C in FIG. 3.

FIG. 6 is a cross section taken along the arrows A—A in FIG. 3, FIG. 7 is a cross section taken along the arrows B—B in FIG. 3, and FIG. 8 is a cross section taken along the arrows C—C in FIG. 3. As shown in these drawings, each of the guide rails 11, 13 is formed along the direction in which the slide base 12 is moved, and extended outwards from the tops of the right and left side walls of the chassis 10.

A recess 31 is respectively formed in outer rails 11A, 13A for receiving a guide piece to be described later. Thus, there exists only the inner rails 11B, 13B in the respective portions with the recess 31 because of being cut away.

Figure 9:
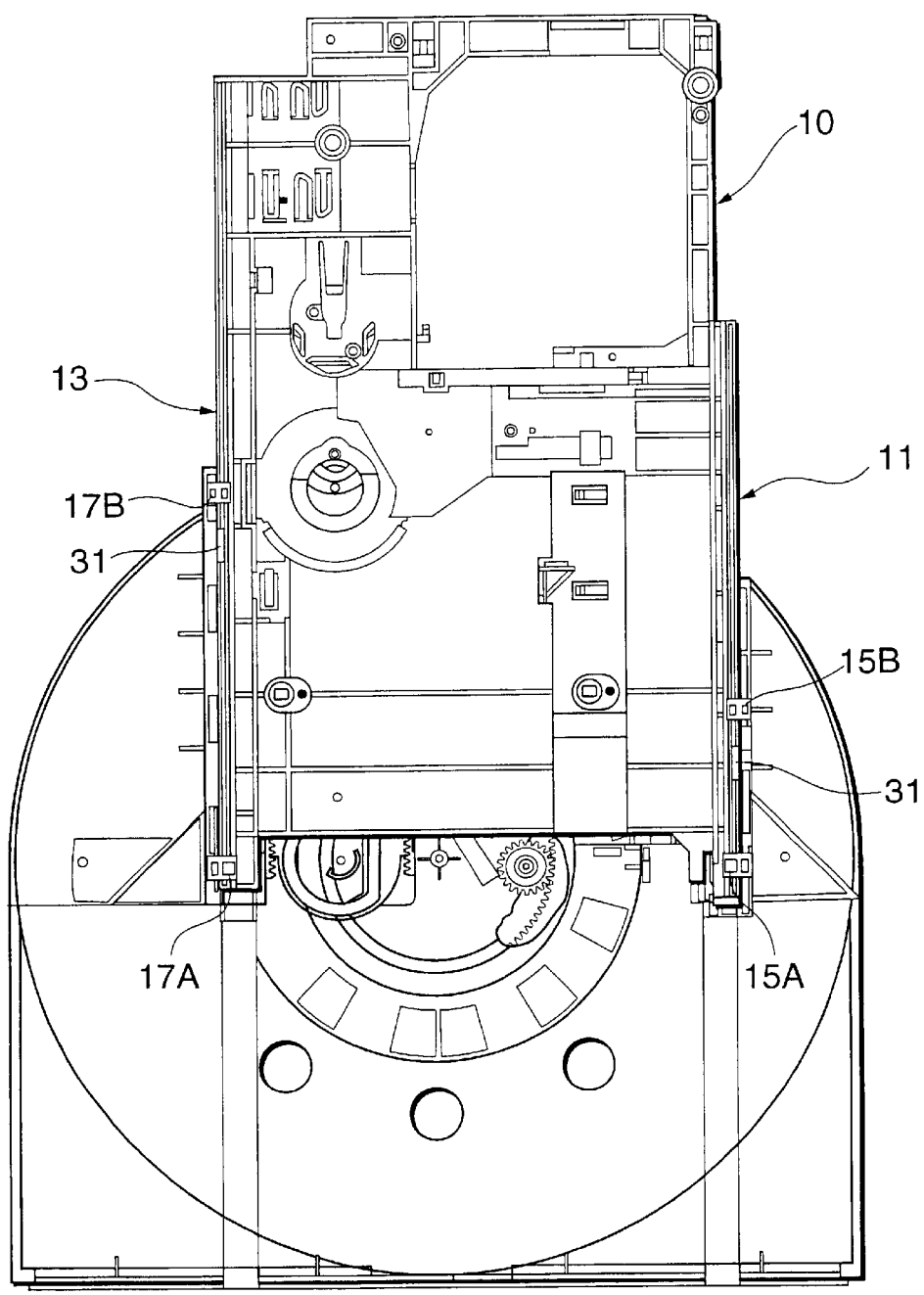
FIG. 9 is a bottom plan view illustrating the chassis and the slide base extending therefrom.

FIG. 9 is a bottom plan view of the chassis 10 and the slide base 12 extended therefrom. FIGS. 10(a), 10(b) and FIGS. 11(a), 11(b) are cross sectional views illustrating the positional relationships between the guide rails 11, 13 of the chassis 10 and first guide pieces 15A, 17A and second guide pieces 15B, 17B of the slide base 12 in mutual engagement. As shown in these drawings, the first guide pieces 15A, 17A and the second guide pieces 15B, 17B are provided on the underside of the slide base 12, extending laterally, and are spaced away from the bottom of the slide base 12, so that they are positioned upper than the guide rails 11, 13 to prevent the slide base 12 from being lifted up during its back and forth movements.

The second guide pieces 15B, 17B are formed on right and left sides respectively, but in asymmetrical arrangement. As can be seen from FIGS. 10(a), 10(b) and FIGS. 11(a), 11(b), each laterally extending length of the second guide pieces 15B, 17B is formed shorter than that of the first guide pieces 15A, 17A. The slide base 12 moves back and forth with its sliding face 12C sliding against the support face 10E of the chassis 10.

The slide base 12 is coupled to the chassis 10 as described below. The second guide pieces 15B, 17B are brought into engagement with the guide rails 11, 13 through the recesses 31, 31 respectively formed therein. The second guide pieces 15B, 17B are asymmetrically located as mentioned above, and the recesses 31, 31 are formed at positions conforming to these asymmetrical positions of the second guide pieces.

Figure 10:
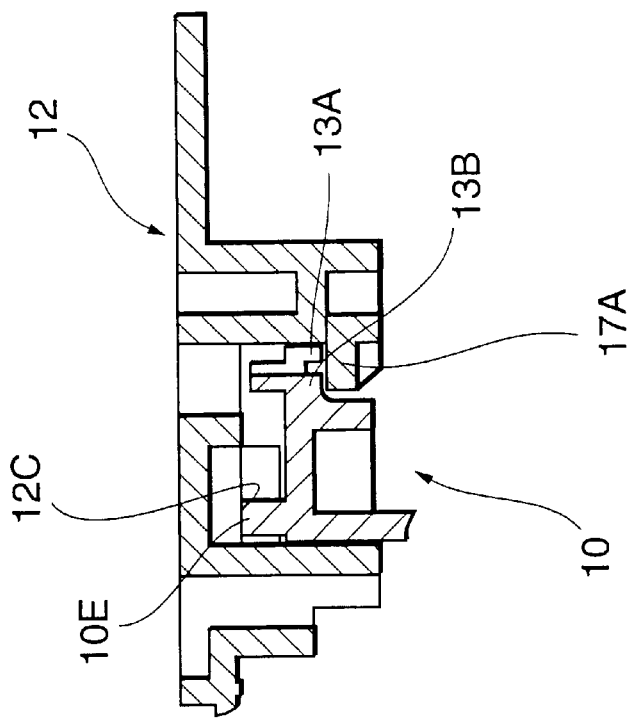
FIGS. 10(a) and 10(b) are cross sectional views illustrating the engagement between the chassis and the slide base.
Figure 10:
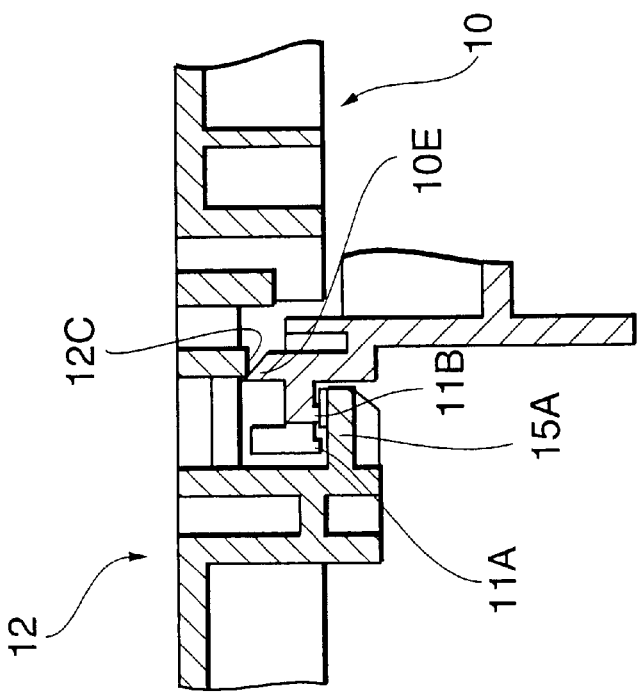
Figure 11:
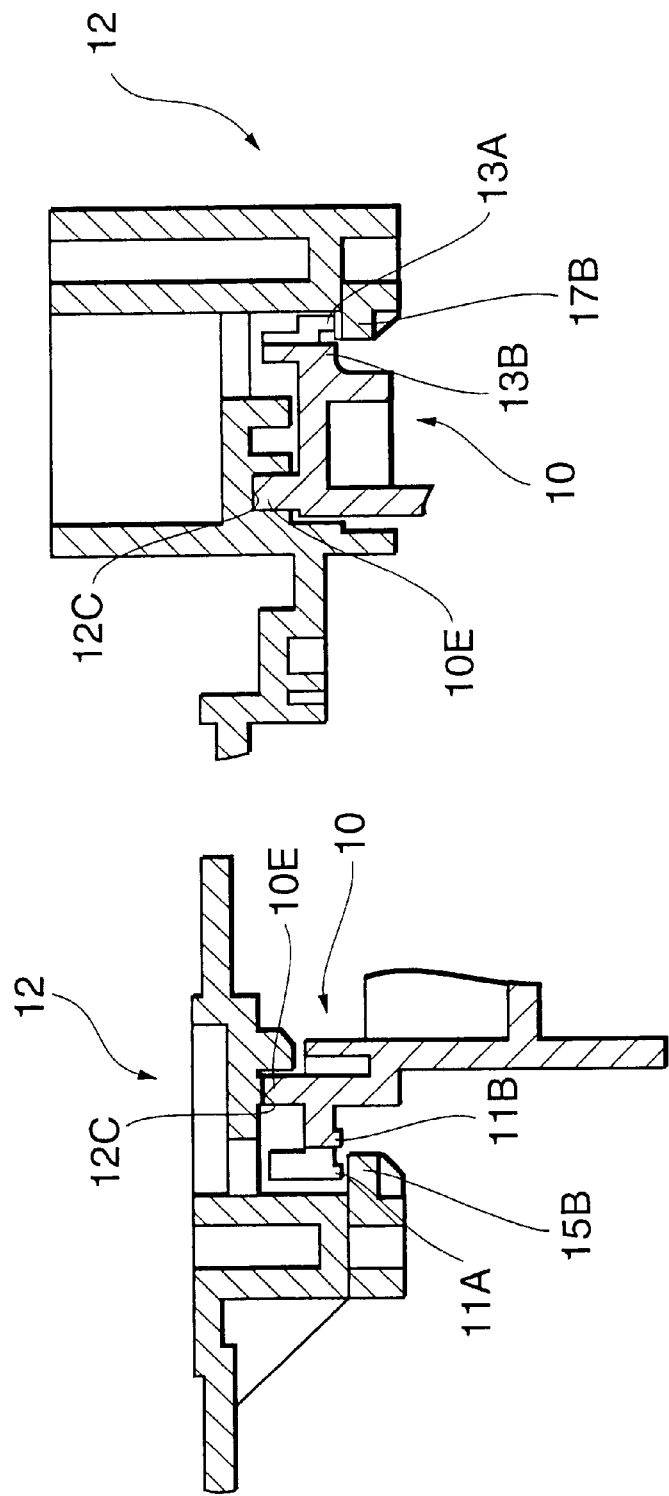
FIGS. 11(a) and 11(b) are cross sectional views likewise illustrating the engagement between the chassis and the slide base.

In this state, when the slide base 12 is moved a certain distance with respect to the chassis 10 towards the store position as shown in FIG. 9, a latching means (not shown) operates to restrict a forward movement of the slide base 12. Thereafter, the second guide pieces 15B, 17B do not permit themselves to be disengaged from the guide rails 11, 13 through the recesses 31, 31 unless the latching means is released. Meanwhile, the inwardly extending first guide pieces 15A, 17A come into engagement with the guide rails 11, 13, snugly fitting under the respective inner guide rails 11B, 13B over the outer rails 11A, 13A as shown in FIGS. 10(a), 10(b), whereby the slide base 12 is attached to the chassis 10.

When inserting the second guide pieces 15B, 17B into the recesses 31, 31 in the guide rails 11, 13, since the first guide pieces 15A, 17A are located in front of the guide rails 11, 13, they do not obstruct the assembly of the slide base 12 to the chassis 10. The slide base 12 is simply moved towards its store position, engagement with the chassis 10 being achieved as illustrated in FIGS. 10(a), 10(b). Since the second guide pieces 15B, 17B are formed shorter than the first guide pieces 15A, 17A in their lateral direction as shown in FIGS. 10(a), 10(b) and FIGS. 11(a), 11(b), they do not reach below the inner guide rails 11B, 13B after the assembling of the slide base 12 to the chassis 10.

A recessed groove is formed between the outer rail 11A and the inner rail 11B and between the outer rail 13A and the inner rail 13B along the sliding direction of the slide base 12 in the embodiment described above. However, such groove is not essential and also the outer and inner rails may be formed coplanar with each other.

When assembling the slide base 12 to the chassis 10, as described above, the second guide pieces 15B, 17B which extend laterally less than the first guide pieces 15A, 17B are first inserted into the recesses 31, after which the slide base 12 is slid. Therefore, as the slide base 12 moves forwards and backwards, the first guide pieces 15A, 17A pass over the recesses 31 smoothly without interference therefrom.

Moreover, the guide rails 11, 13 on both sides are not arranged symmetrically about the centerline but are offset in the lateral direction, one of the guide rails 11, 13 (guide rail 11) being shorter than the other. This allows the widthwise dimension between the guide rails 11, 13 to be set wider and provides enhanced freedom of design in comparison to an arrangement in which both guide rails have the same length.

Figure 12:
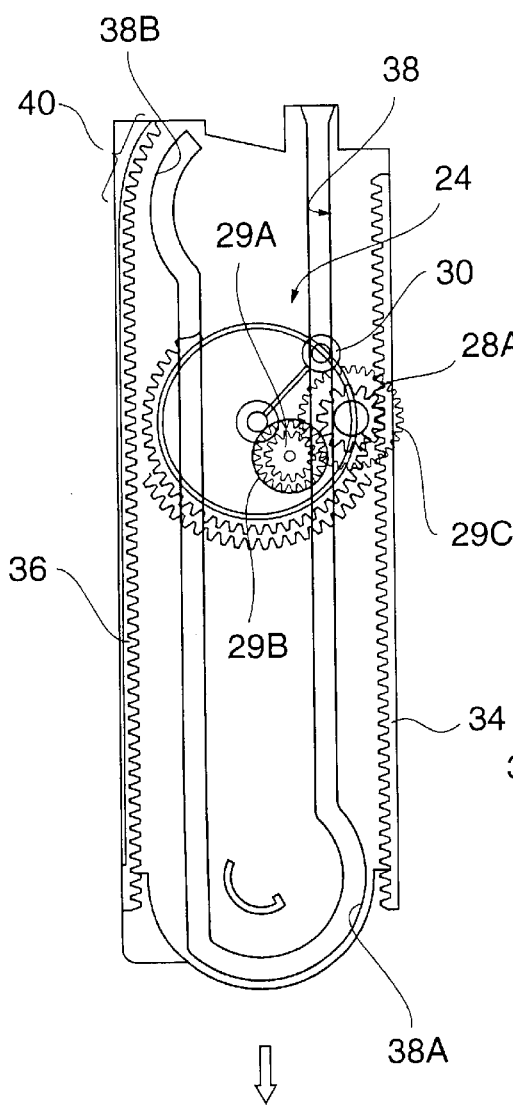
FIGS. 12(a) and 12(b) are diagrams given in explanation of the movement of the rotary member with respect to the slide base.
Figure 12:
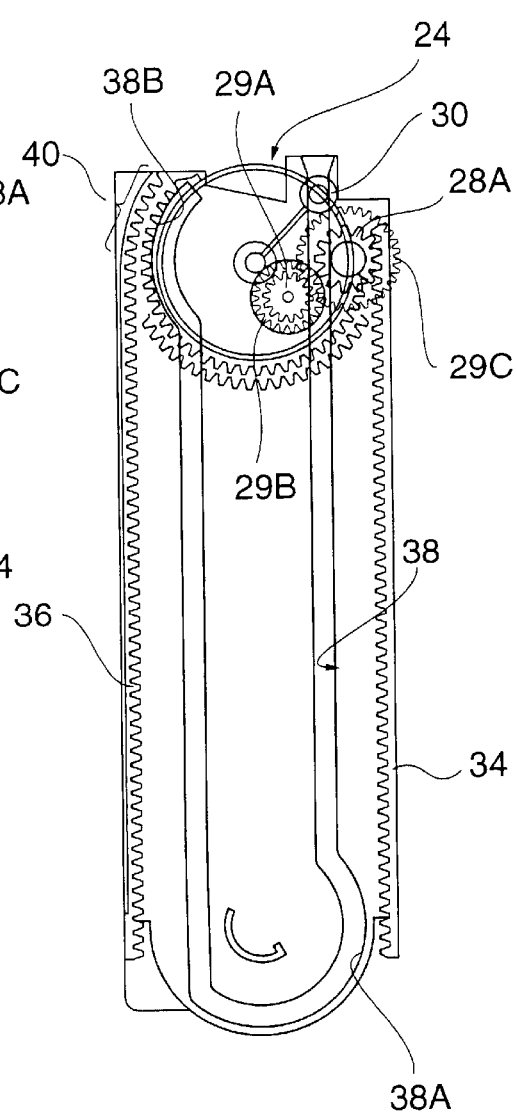

FIGS. 12(a), 12(b) are diagrams given in explanation of the movement of the rotary member 24 with respect to the slide base 12. The drawings represent top views in perspective of the slide base 12 and the rotary member 24 mounted on the chassis 10.

FIG. 12(a) illustrates a state wherein the slide base 12 is moving forwards (downwards in the drawing) with respect to the chassis 10. The planetary gear 28A rotates in engagement with the first linear rack gear 34, thereby imparting the forward movement of the slide base 12. At this time, a rotational drive force is transmitted to the planetary gear 28A from the sun gear 10C (not shown in FIG. 12(a)) mounted on the chassis 10, through the reduction gears 29A, 29B and the transmission gear 29C. The lock pin 30 of the rotary member 24 moves along in sliding engagement with the linear cam groove 38.

FIG. 12(b) illustrates a state wherein the slide base 12 has completely extended on the chassis 10. The planetary gear 28A at this time is positioned at the back end of the first linear rack gear 34. If the slide base 12 is pushed in this state, a sensor detects the backward movement of the slide base and a built-in push-close mechanism is operated, the sun gear 10C being reversely rotated to withdraw the slide base 12 into the casing.

FIGS. 13(a), 13(b) are schematic perspective views showing the relationship between the clamp cam 22 and the switch gear 23. The switch gear 23 has a transmission gear 23A partially formed to the circumference thereof, which engages with the clamp gear 32 of the rotary member 24 shown in FIG. 4. The switch gear 23 further includes a pinion gear 23B which is coaxial with the transmission gear 23A for engaging with a rack 22A of the clamp cam 22. The clamp cam 22 has a pair of cam grooves 22B, 22B formed therein, in which a pair of cam pins 20C, 20C on the above-mentioned float base 20 are inserted, so that sliding movements of the clamp cam 22 can impart vertical motion to the float base 20 so as to clamp and release a disc.

FIGS. 14(a) through 14(c) are diagrams given in explanation of the movement of the rotary member 24 similarly to FIGS. 12(a), 12(b), illustrating various movements of the rotary member 24 during a clamping operation of a disc. FIG. 14(a) illustrates a state immediately after the slide base 12 has been returned to its disc store position. The first and the second linear rack gears 34, 36 are located near and above the first arcuate rack gear 27 formed in the chassis 10, after the slide base 12 has moved to the disc store position, and the lowermost planetary gear 28B supported around the shaft 26 is brought into engagement with the first arcuate rack gear 27.

Thereupon, the planetary gear 28B engages with the first arcuate rack gear 27 formed in the chassis 10, the lock pin 30 on the rotary member 24 being guided along an arcuate cam groove 38A, whereby the rotary member 24 starts revolving in the direction of the arrow.

The arcuate cam groove 38A is formed substantially in the shape of a deformed letter U, bulging further than the distance between the equally spaced linear cam grooves 38, corresponding to the arrangement of the lock pin 30 which is circumferentially offset at 45 degrees with respect to the planetary gear 28B. This is because, if the arcuate cam groove was simply U-shaped, there would be too much play for the planetary gear 28B, resulting in unstable movements of the slide base 12. In other words, by forming the arcuate cam groove in the deformed U-shape, the planetary gear 28B and the lock pin 30 will not be aligned in a straight line on the cam groove, whereby there is only little play for the planetary gear 28B.

Figure 15:
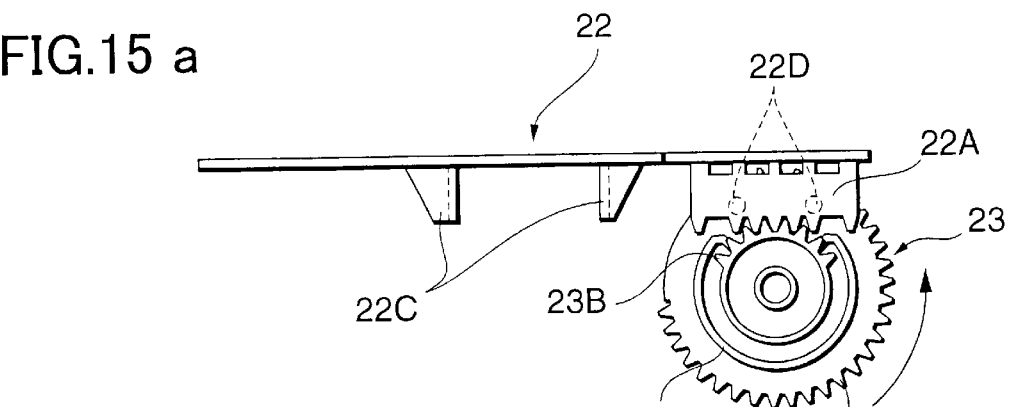
FIGS. 15(a) through 15(d) are top plan views showing the movements of the clamp cam of the clamp and the switch gear.
Figure 15:
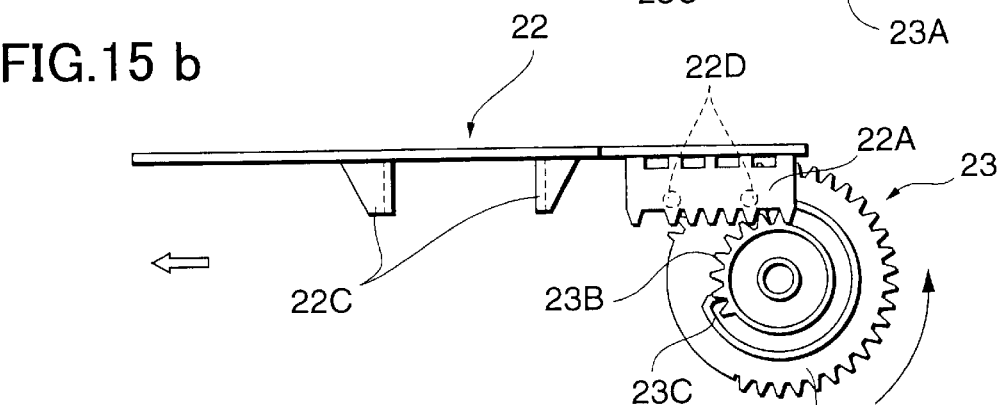
Figure 15:
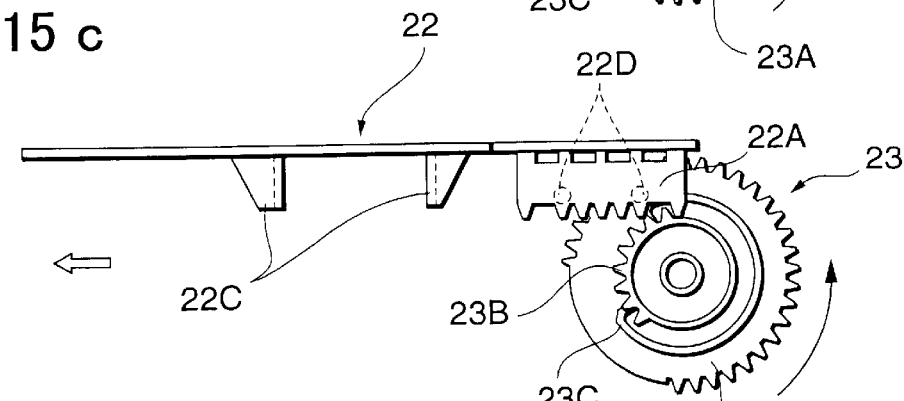
Figure 15:
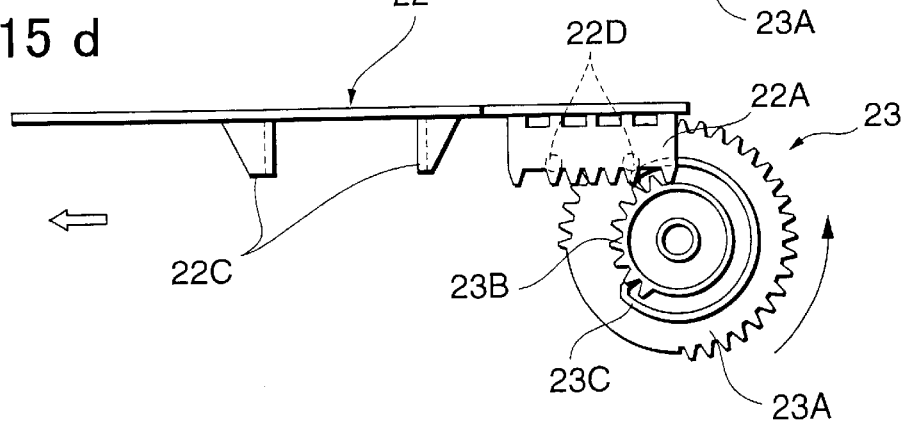

When the rotary member 24 reaches a position illustrated in FIG. 14(b), its clamp gear 32 toothes with the transmission gear 23A of the switch gear 23, whereby the pinion gear 23B engages with the rack 22A of the clamp cam 22 as shown in FIG. 15(a), causing the clamp cam 22 to slide in the direction of the arrow.

The clamp cam 22 is continuously moved from one to another of the states shown in FIGS. 15(b) through FIG. 15(d), as a result of which the cam pins 20C, 20C of the float base 20 are guided along the slant surfaces of the cam grooves 22B, 22B as shown in FIG. 13(b). Thereby, the float base 20 is rotated upwards around the rotary shafts 20A for clamping a disc. As shown in FIGS. 15(a) through (d), a pair of stop pins 22D are protruded on the underside of the rack 22A. The clamp cam 22 is locked so as not to slide further from the state shown in FIG. 15(d) by the abutment of the stop pin 22D with an arcuate cam 23C of the switch gear 23. By this time, the rotary member 24 has revolved to a position illustrated in FIG. 14(c).

Since the planetary gear 28B is in engagement with the first arcuate rack gear 27 integrally formed in the chassis 10, the reaction forces developed with the clamping operation are applied only to the chassis 10, ensuring stable clamping operation. Also, adverse effects of vibration or the like after the clamping are reduced.

The clamp cam 22 is provided with a pair of right and left projections 22C for moving a sensor switch 33 shown in FIG. 3. The sensor switch 33 indicates a current clamping state corresponding to its turning position, the rightmost position indicating a disc-unclamped state, an intermediate position indicating a clamping operation being performed, and a leftwards turned position indicating a disc-clamped state. The signals indicative of respective states of the clamp cam 22 are output from the sensor switch 33 to a controller (not shown).

Figure 16:
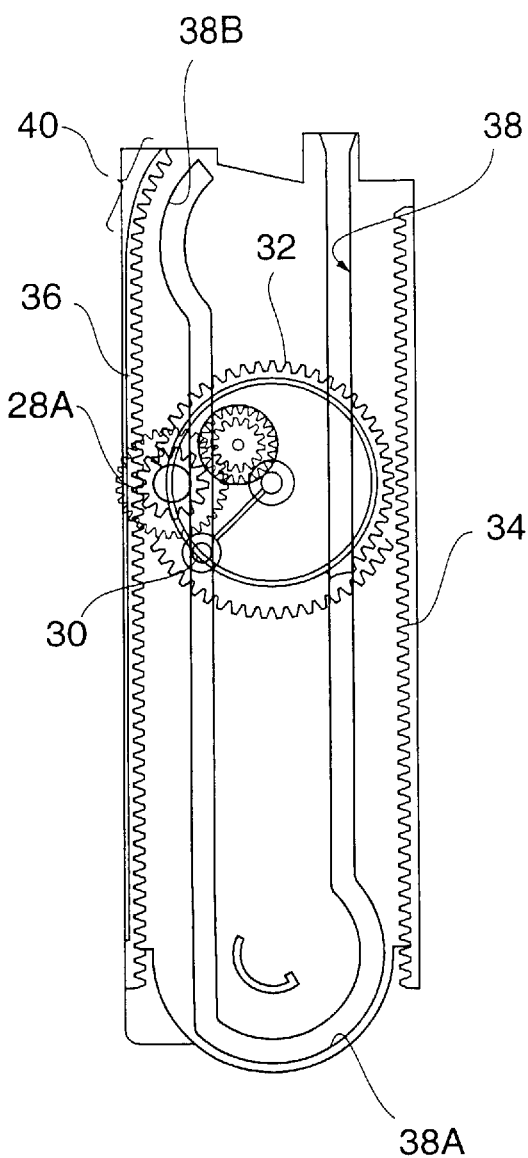
FIGS. 16(a) and 16(b) are diagrams given in explanation of the movement of the rotary member with respect to the slide base in this embodiment.
Figure 16:
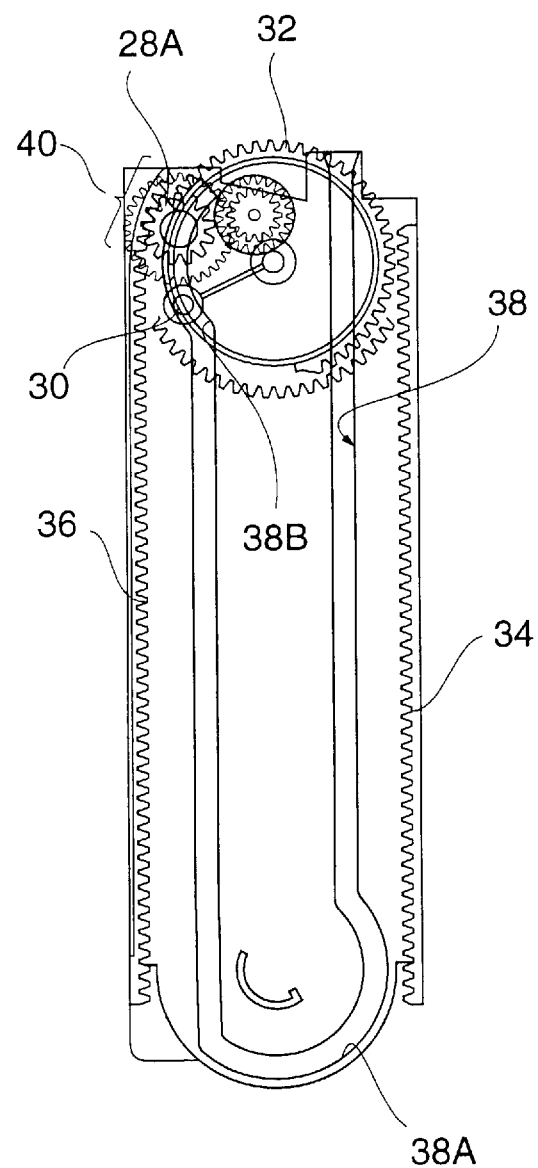

Next, the following explains the movement of the rotary member 24 when discs on the rotary tray 14 are exchanged during the play of a disc. FIGS. 16(a), 16(b) are diagrams given in explanation of the movement of the rotary member 24 during the disc exchange while the other disc is being played. When the planetary gear 28A rotates in engagement with the second linear rack gear 36 formed on the underside of the slide base 12 while a disc is being played, the slide base 12 is moved from the position shown in FIG. 14(c) through the state shown in FIG. 16(a) towards the direction in which it projects from the casing.

Under a state illustrated in FIG. 16(b) wherein the slide base 12 has reached its disc exchange position where it is completely extended from the casing, the radius center of an arcuate lock cam groove 38B and that of the second arcuate rack gear 40 conform to the axis of the sun gear 10C (not shown in FIG. 16(b)).

Further rotation of the sun gear 10C causes the planetary gear 28A to revolve in engagement with the second arcuate rack gear 40, while the lock pin 30 slides into the arcuate lock cam groove 38B, as a result of which the slide base 12 is kept in position not to move back and forth. Accordingly, the slide base 12 does not allow itself to be pushed back into the casing, and the push-close mechanism is not activated. In this way, parts for locking the push-close mechanism which had to be additionally provided in the prior art are dispensed with, leading to a reduction in the number of components.

The arcuate lock cam groove 38B is curved outwards corresponding to the position of the lock pin 30 for the reasons similar to those for the above-described arcuate cam groove 38A.

Figure 17:
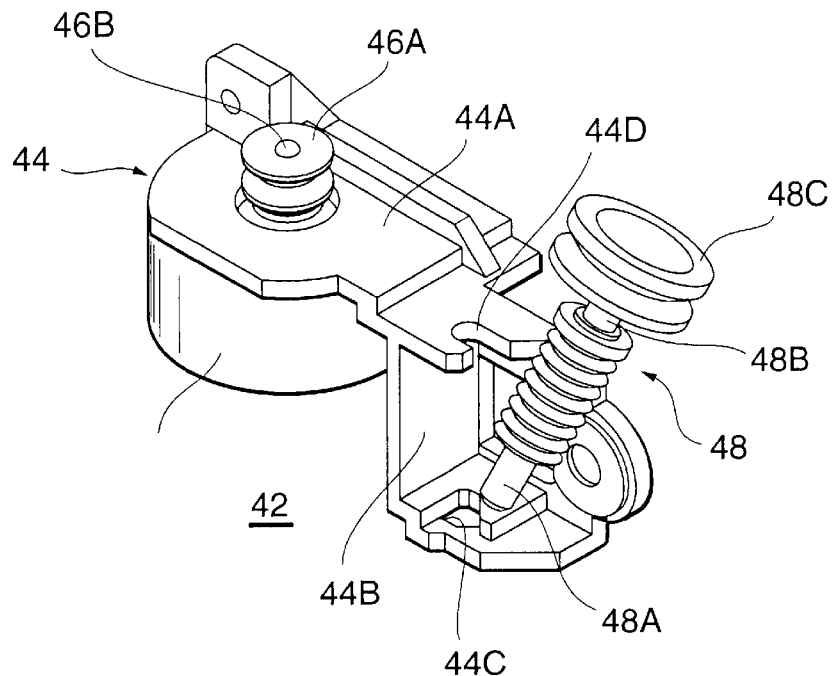
FIG. 17 is a perspective view showing the details of a mechanism for driving a rotary tray in this embodiment.
Figure 18:
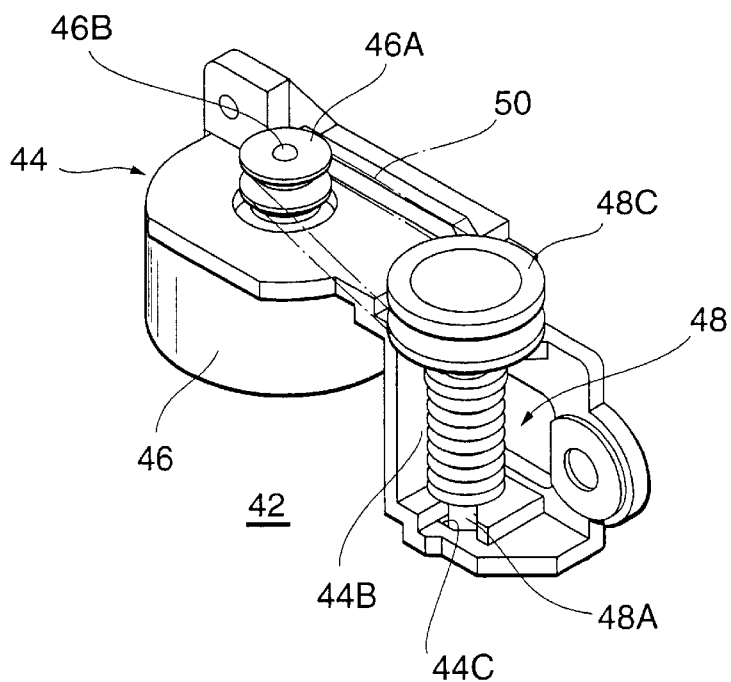
FIG. 18 is a perspective view likewise showing the details of the mechanism for driving the rotary tray in this embodiment in a state after being assembled.

Next, a drive mechanism for rotating the rotary tray 14 will be described. The drive mechanism 42 for the rotary tray 14 is provided on the backside of the rotary tray 14 as shown in FIG. 17. FIG. 17 and FIG. 18 are perspective views illustrating the details of the drive mechanism 42. As shown, the drive mechanism 42 is composed of a motor holder 44, a motor 46, a worm gear 48, and the like. The motor 46 connected to a flexible cable to be described later is secured to a motor mount piece 44A of the motor holder 44, and the rotary shaft 46B projects upwards, at the top end of which a pulley 46A is held therearound.

The motor holder 44 has a socket 44B for mounting the worm gear 48. The socket 44B comprises a support hole 44C into which a lower shaft 48A of the worm gear 48 is inserted, and a cut-out 44D for supporting an upper shaft 48B of the worm gear 48. A pulley 48C having a larger diameter than the pulley 46A of the motor 46 is held around the upper shaft 48B. The worm gear 48 toothes with a gear (not shown) provided in the rotary tray 14 and transmits the rotation of the motor 46 to the rotary tray 14, thereby rotating the same.

The drive mechanism 42 for the rotary tray 14 is assembled in the following procedures. First, the lower shaft 48A of the worm gear 48 is inserted into the support hole 44C of the socket 44B, while the upper shaft 48B of the worm gear 48 is fitted into and abutted against the cut-out 44D. A rubber belt 50 is then stretched between the pulleys 46A, 48C, so that the upper shaft 48B of the worm gear is pressed against the cut-out 44D by the tension of the rubber belt 50. Accordingly, the worm gear 48 does not come off as long as the rubber belt 50 is provided.

Thus the worm gear 48 can be mounted simply by fitting its upper shaft 48B to the socket 44B and providing the rubber belt 50. In this way, the labor involved in the assembling operation is saved and the number of components reduced, whereby a reduction in production cost is achieved.

Figure 19:
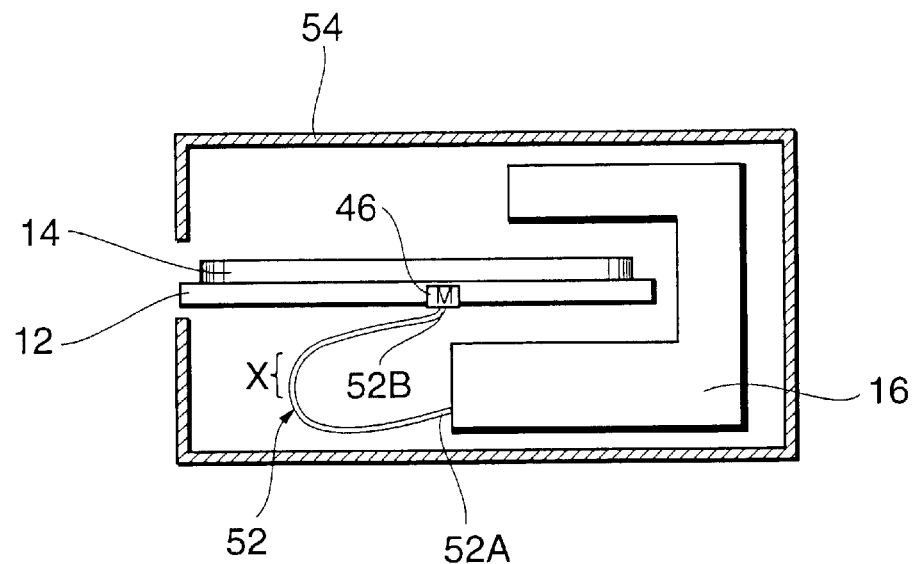
FIG. 19 is a diagram given in explanation of the arrangement for connecting a flexible cable for supplying power to a motor for driving the rotary tray.
Figure 20:
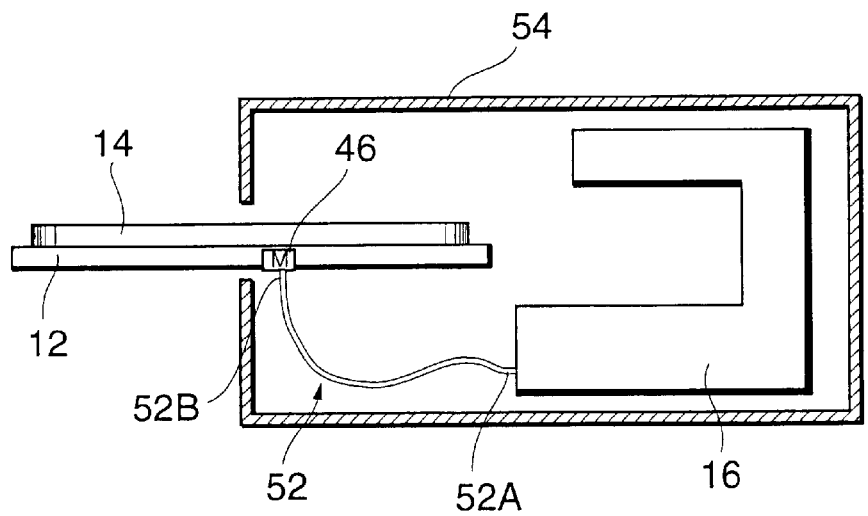
FIG. 20 is a diagram likewise given in explanation of the arrangement for the flexible cable, in which the slide base is moved to the disc exchange position.

FIG. 19 and FIG. 20 are diagrams given in explanation of the arrangement for connecting a flexible cable 52 provided for supplying power, and the like, to the motor 46 for driving the rotary tray 14. As shown in these drawings, the casing 54 accommodates therein the slide base 12, the rotary tray 14, the player 16, and the like. The player 16 is mounted on the chassis 10 (not shown in FIGS. 19 and 20). The wiring for power supply and control from the player 16 to the motor 46 is accomplished with the flexible cable 52.

When the slide base 12 is located in its disc store position shown in FIG. 19, the flexible cable 52 is bent at a position denoted X, which is ahead of one end 52A and the other end 52A thereof. In this way, the player 16 and the flexible cable 52 do not interfere with each other, while the space within the chassis 10 is effectively utilized for permitting the flexible cable 52 to be moved freely. Thus the overall size of a disc player including the casing 54 can be reduced, and the length of the flexible cable 52 can be made to a minimum.

Figure 21:
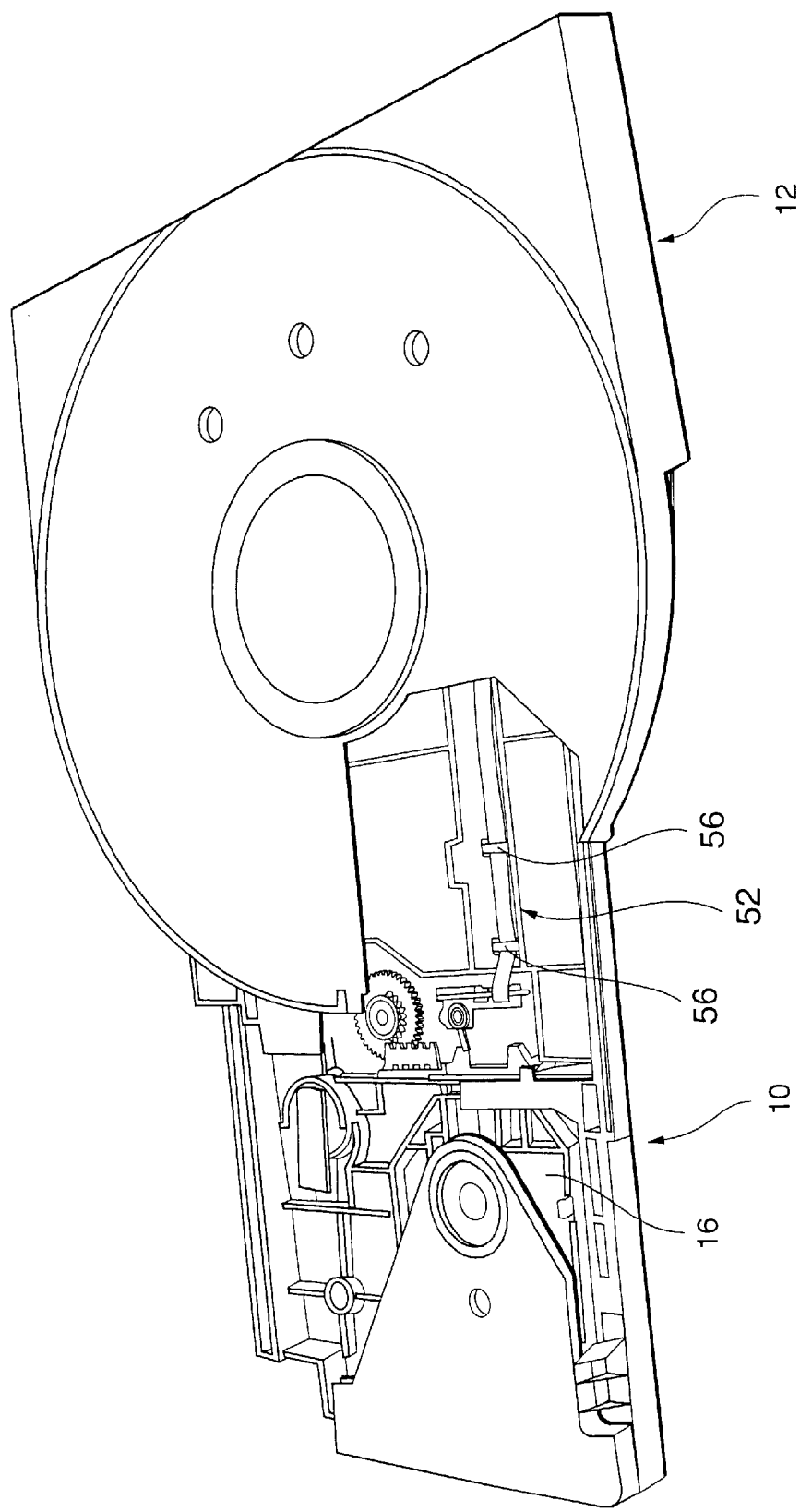
FIG. 21 is an overall perspective view showing the chassis and the slide base from which the rotary tray has bee removed.

When the slide base 12 is located at its disc exchange position extending from the casing 54 as shown in FIG. 20, the motor 46 and the flexible cable 52 connected thereto remain within the casing, and the connection joint therebetween on the slide base is prevented from being exposed to the outside. Furthermore, as shown in FIG. 21, a plurality of hooks 56 for holding the flexible cable 52 (only two shown in the drawing) are provided on the bottom of the chassis 10 as required, so as to prevent such unstable movements of the flexible cable 52 within the casing 54 that the cable touches and separates from the chassis 10 randomly.

Figure 22:
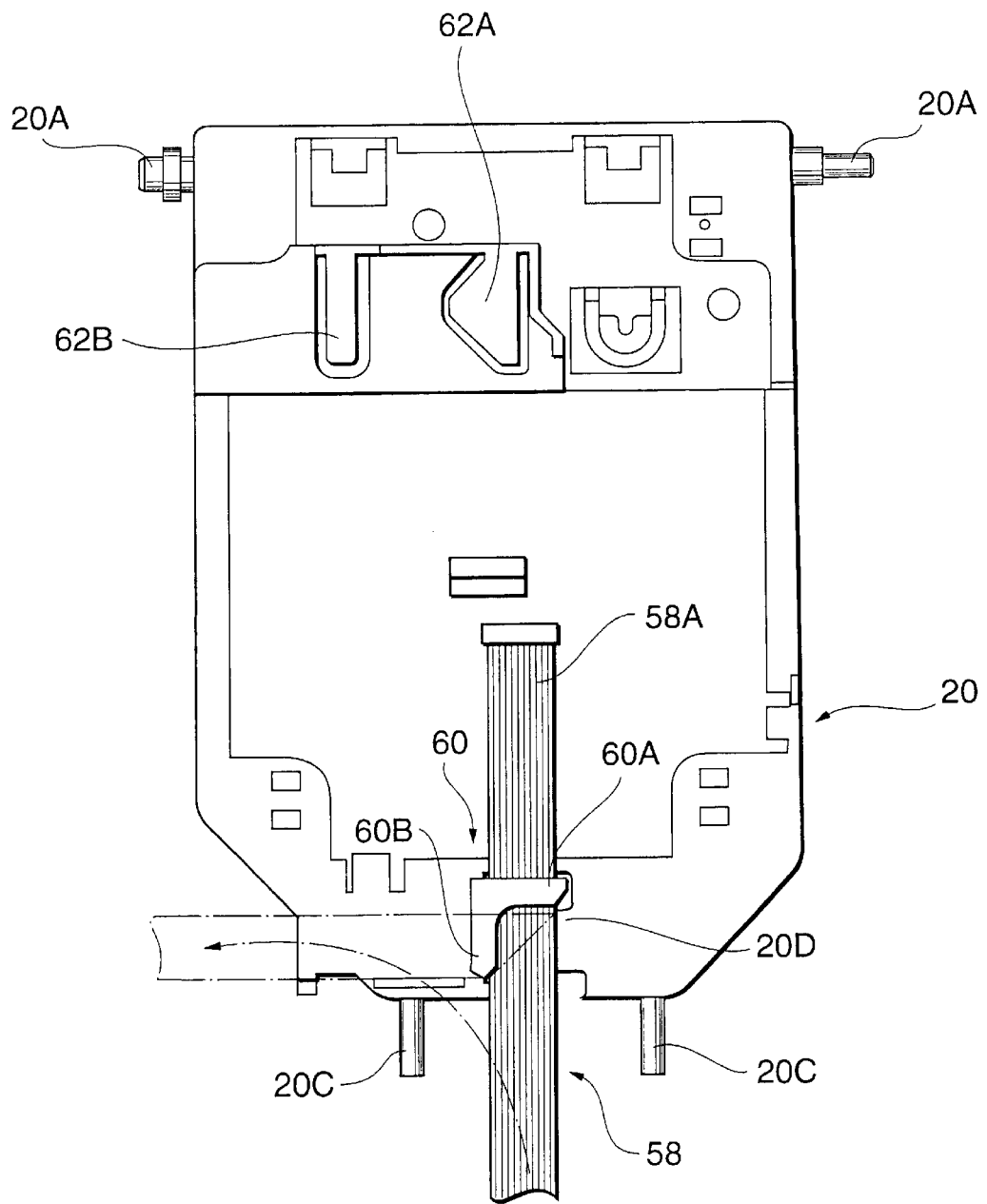
FIG. 22 is a bottom plan view of a float base.
Figure 23:
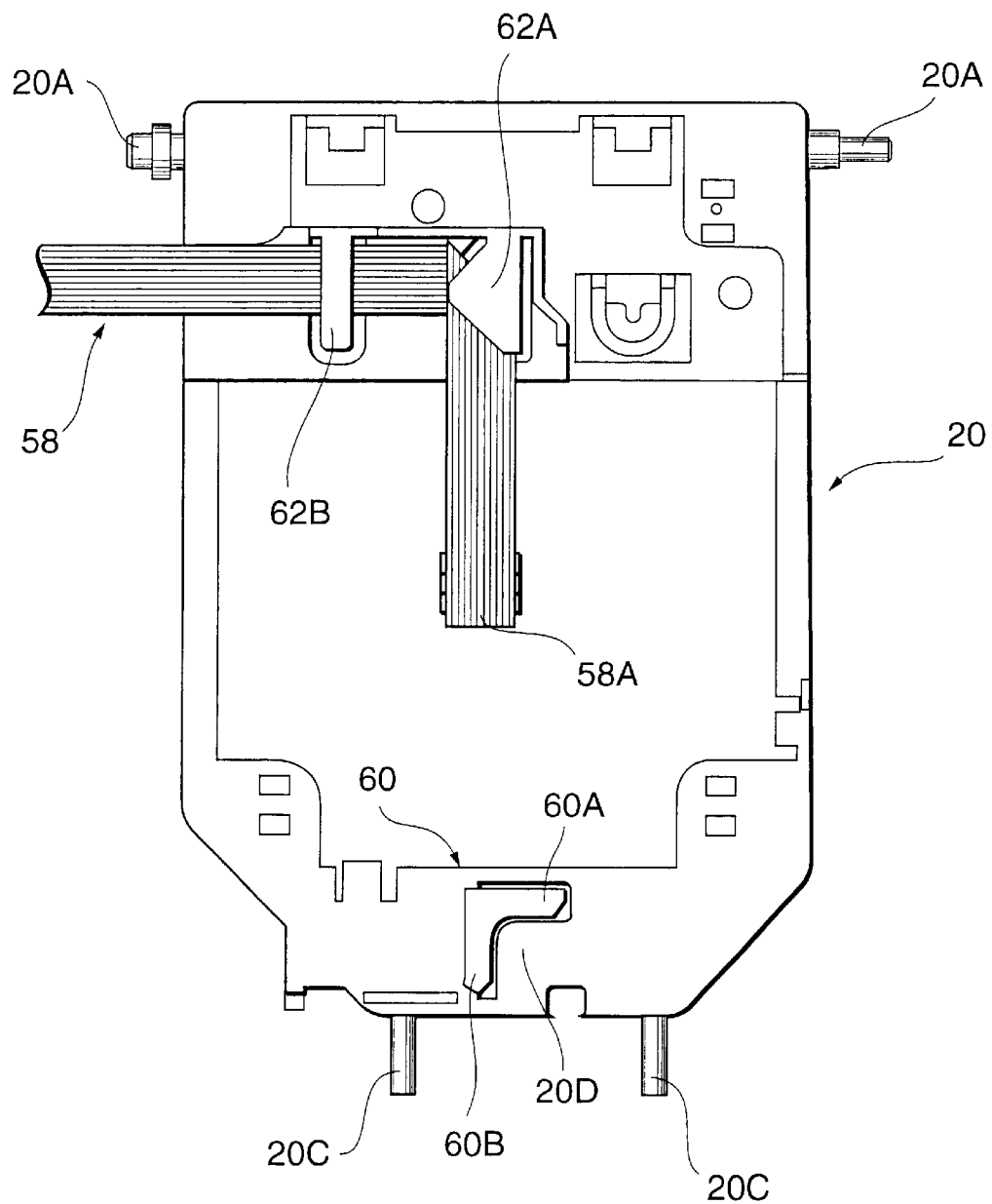
FIG. 23 illustrates likewise the bottom of the float base.

FIG. 22 and FIG. 23 are bottom plan views of the float base 20. Since the player 16 and the others are mounted on the float base 20, one end 58A of the flexible cable 58 is connected to the bottom of the float base 20 for input/output of control signals with respect to the player 16 and the like and for power supply thereto from a circuit substrate (not shown).

A bending piece 60 formed in the shape of a hook is provided in the front part on the bottom of the float base 20. The bending piece 60 includes a lateral piece 60A and a longitudinal piece 60B, which are respectively formed with a certain clearance between themselves and the underside 20D of the float base 20 so as to permit the flexible cable 58 to pass therethrough. In other words, the bending piece 60 is attached to the underside of the float base 20 at the intersection between the lateral piece 60A and the longitudinal piece 60B.

The bending piece 60 is used mainly for the purpose of enhancing production efficiency, i.e., it is used for folding the flexible cable 58 at a given location so as to allow itself to be accommodated at a predetermined position on the underside of the float base 20 so as to save the labor for measuring the flexible cable 58 each time to determine the position at which it should be folded during the production thereof.

More specifically, the bending piece 60 is used during the manufacture of the disc player as described below. First, the flexible cable 58 is passed through the clearance between the lateral piece 60A and the underside 20D of the float base 20 as shown in FIG. 22. Then, the flexible cable 58 is laterally folded back as indicated by the dash-single-dot line in FIG. 22 and passed through the clearance between the longitudinal piece 60B and the underside 20D of the float base 20 for determining a folding position of the flexible cable 58.

Next, the flexible cable 58 which has been folded in accordance with certain dimensions is released from the bending piece 60, turned over at one end 58A in the reverse direction as shown in FIG. 23, and passed through original hold pieces 62A, 62B provided at a corresponding mounting location of the cable 58. In this way, the flexible cable 58 is attached to the float base. The bending piece 60 provided on the bottom of the float base 20 thus facilitates measuring of a folding position of the flexible cable 58 and bending of the same, and contributes to enhancement of the production efficiency.

Figure 24:
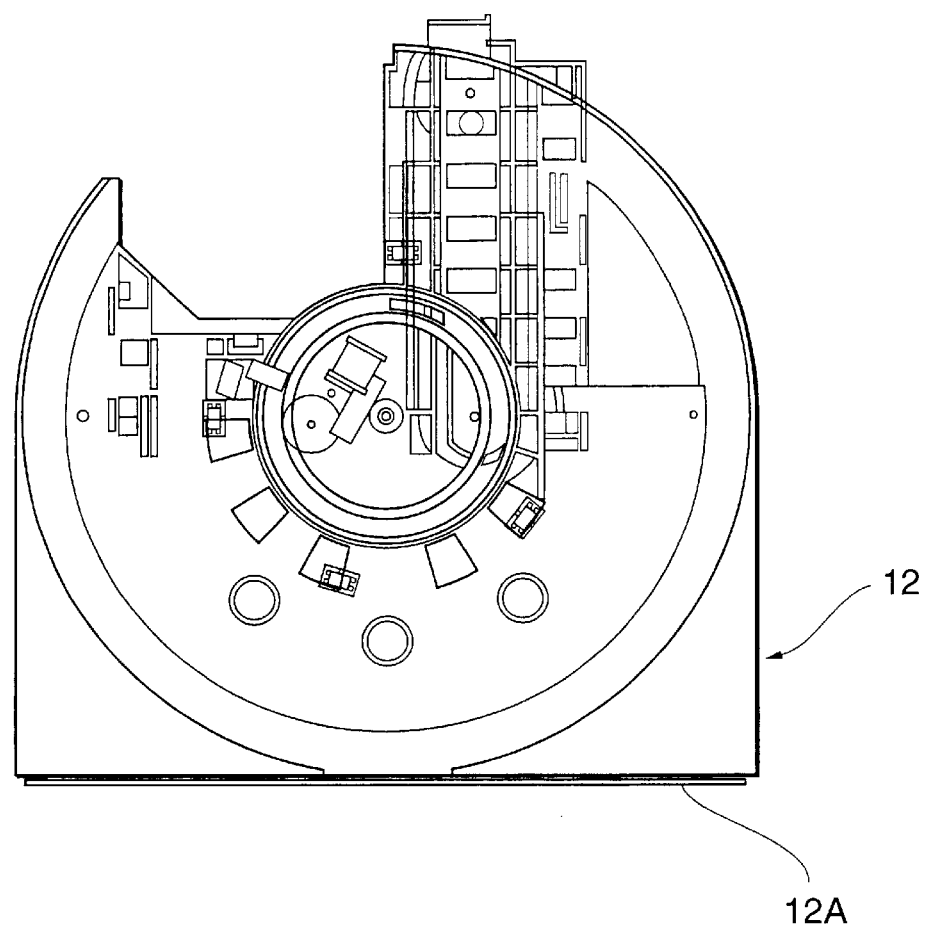
FIG. 24 is a top plan view of the slide base.
Figure 25:
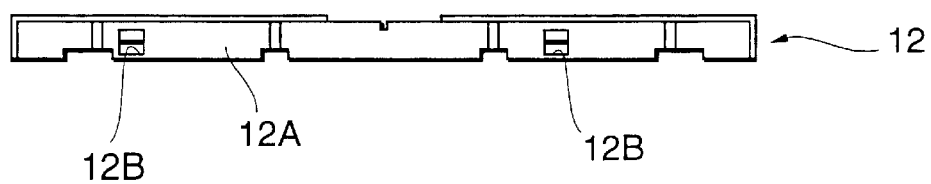
FIG. 25 is a front view of the slide base.
Figure 26:
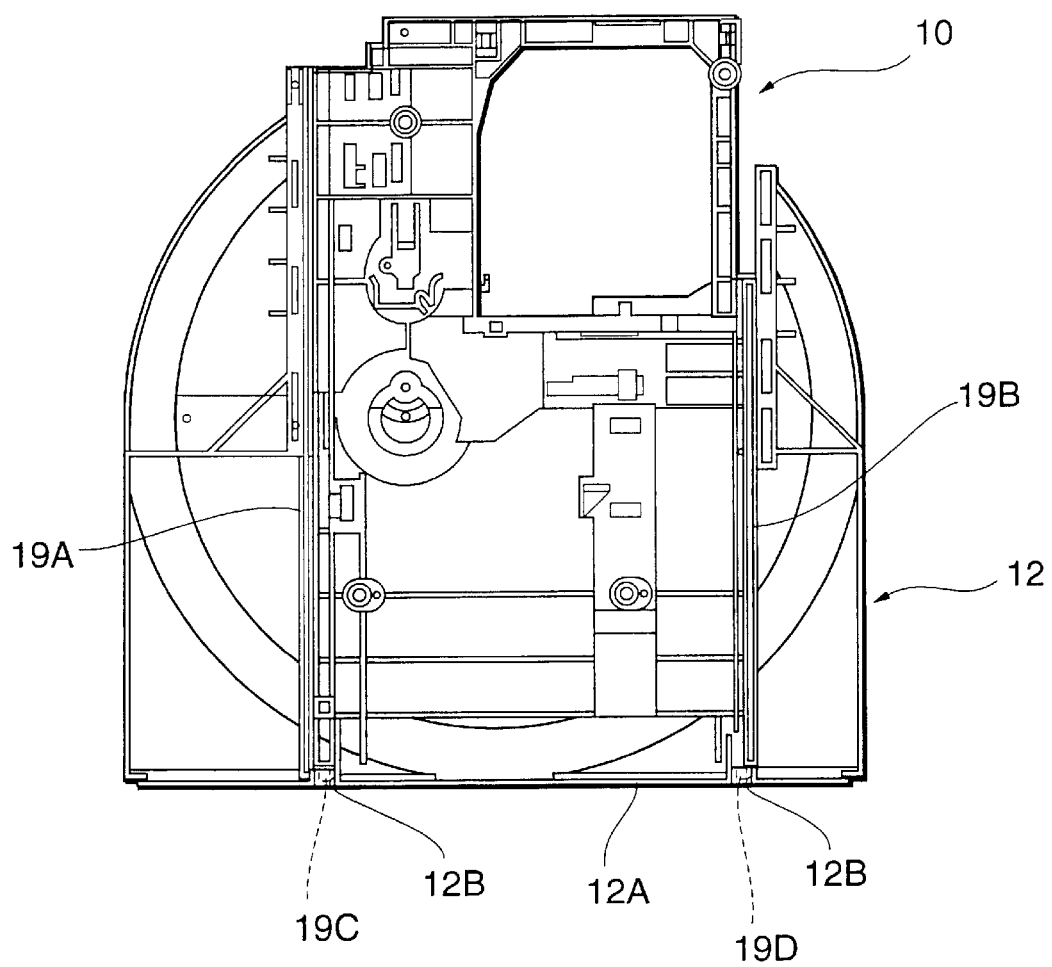
FIG. 26 is a bottom plan view of the chassis to which the slide base is attached.

FIG. 24 is a top plan view of the slide base 12 from which the rotary tray has been removed, FIG. 25 is a front view of the slide base 12 shown in FIG. 24, and FIG. 26 is a bottom plan view of the chassis 10 to which the slide base 12 is attached. As shown in these drawings, a pair of engagement holes 12B, 12B are opened in a front end wall 12A of the slide base 12. These engagement holes 12B are located at positions so as to receive the distal ends 19C, 19D of the guide rails 19A, 19B of the chassis 10, when the slide base 12 is moved to its disc store position, as shown in FIG. 26.

Thus the slide base 12 at its disc store position is prevented from being lifted, and therefore rattling of the slide base 12 is prevented.

Although the embodiment of the invention has been described above by way of example as a so-called carousel-type disc player capable of accommodating a plurality of discs, it should be noted that the present invention is applicable also to a single disc player.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. A disc player comprising:
a chassis;
a rotary tray mountable a plurality of discs arranged in a circumferential direction thereon;
a slide base supported on said chassis for supporting said rotary tray;
a rotary tray driving mechanism for rotating said rotary tray on said slide base;
a slide base driving mechanism for moving said slide base back and forth on said chassis between a disc exchanging position where the slide base is projected ahead of the chassis and a disc storing position where the slide base is substantially overlapped with the chassis; and
a player disposed backward within said chassis,
wherein said rotary tray driving mechanism includes a driving source provided on said slide base, and wiring for supplying an electric power and control signals to said driving source, and
wherein said wiring is connected to said driving source at one end thereof, and to said chassis at the other end, which is bent at a position ahead of the one end and the other end of said wiring when said slide base is positioned at the disc storing position.

2. The disc player according to claim 1, wherein the one and the other end of said wiring is connected to said driving source and said chassis, respectively, ahead of said player.

3. The disc player according to claim 1, said chassis is provided with a holding hook for preventing said wiring from separating from said chassis.

4. The disc player according to claim 1, wherein said driving source is positioned on said slide base in such a manner that a connecting portion between said driving source and said wiring remains within a casing of the disc player even when said slide base is moved to the disc exchanging position.

5. The disc player according to claim 1, further comprising:
a float base supported on said chassis; and
a bending piece mounted on said float base for folding said wiring at a given location in advance so as to allow said wiring to be accommodated at a predetermined position where a direction of the wiring is altered.

6. The disc player according to claim 5, wherein said bending piece comprises a lateral piece and a longitudinal piece, which are respectively formed with a certain clearance between themselves and an underside of said float base, and both outward ends of which are used for folding the wiring.

7. A disc player comprising:
a chassis;
a rotary tray mountable a plurality of discs arranged in a circumferential direction thereon;
a slide base supported on said chassis for supporting said rotary tray;
a rotary tray driving mechanism for rotating said rotary tray on said slide base;
a slide base driving mechanism for moving said slide base back and forth on said chassis between a disc exchanging position where the slide base is projected ahead of the chassis and a disc storing position where the slide base is substantially overlapped with the chassis;
a player disposed backward within said chassis;
a guide rail formed on each right and left side of said chassis in a moving direction of said slide base; and
a first guide piece and a second guide piece provided on each side of an underside of said slide base, said each side having the same width as that of guide rails, extending laterally, so as to allow said slide base to be slid along said guide rail,
wherein said first and second guide pieces are positioned upper than said guide rail so as to prevent said slide base from being lifted up during its back and forth movement.

8. The disc player according to claims 7, wherein said each guide rail has a recess for inserting said second guide piece so that said slide base is able to be slid along said guide rail of said chassis after inserting said second guide piece into the recess so as to assemble said slide base with said chassis.

9. The disc player according to claim 7, wherein said second guide piece has a lateral length shorter than that of said first guide piece so as to be easily inserted into said guide rail through said recess on the guide rail.

10. The disc player according to claim 7, further comprising:
a front end wall of said slide base having engagement holes,
wherein said each engagement hole is engaged with respective front distal ends of said guide rails to receive it when said slide base exists in the disc storing position, so that said slide base is able to be prevented from being lifted.

* * * * *